United States Patent
Veloz

[15] 3,637,342
[45] Jan. 25, 1972

[54] STERILIZATION OF FLUIDS BY ULTRAVIOLET RADIATION

[72] Inventor: Louis P. Veloz, 500 South Madison St., Pasadena, Calif. 91106

[22] Filed: May 7, 1969

[21] Appl. No.: 822,474

[52] U.S. Cl. ..........................21/102 R, 21/54 R, 21/DIG. 2, 250/43, 250/48
[51] Int. Cl. ......................................................A61l 3/00
[58] Field of Search........................21/101, DIG. 2, 54, 102; 250/43, 48

[56] References Cited

UNITED STATES PATENTS

| | | |
|---|---|---|
| 1,193,143 | 8/1916 | Henri et al.................................21/101 |
| 1,196,481 | 8/1916 | Von Recklinghausen et al. .......21/101 |
| 2,457,761 | 12/1948 | Wesner...................................250/48 X |
| 2,669,661 | 2/1954 | Riddiford et al..........................250/43 |
| 3,079,498 | 2/1963 | Ruffin...................................250/48 X |
| 3,182,193 | 5/1965 | Ellner et al. ..............................21/101 |
| 3,433,946 | 3/1969 | Hardwick..............................21/102 X |
| 3,462,597 | 8/1969 | Young..................................21/102 X |

OTHER PUBLICATIONS

W. H. Halliwell, " Heat Resistant Resin for Industrial Purposes," Modern Plastics, Nov. 1947, pp. 108–109
DuPont Information Bulletin No. X-90a, " Teflon 100 FEP," 8-1960, pp. 1, 2, 14 & last page relied on
DuPont Technical Information Bulletin T-5 (Optical), pages 1 & 2, 12-1965

Primary Examiner—Joseph Scovronek
Assistant Examiner—Barry S. Richman
Attorney—William P. Green

[57] ABSTRACT

A fluid sterilizer including a pressure vessel through which fluid to be sterilized is directed, and containing at least one partition formed of a material adapted to pass ultraviolet radiation, with a source of such radiation being positioned to emit ultraviolet radiation first through fluid within a compartment at one side of the partition, and then through the partition and into fluid contained within a second compartment at the opposite side of the partition, in a manner assuring maximum utilization of the available radiation.

7 Claims, 4 Drawing Figures

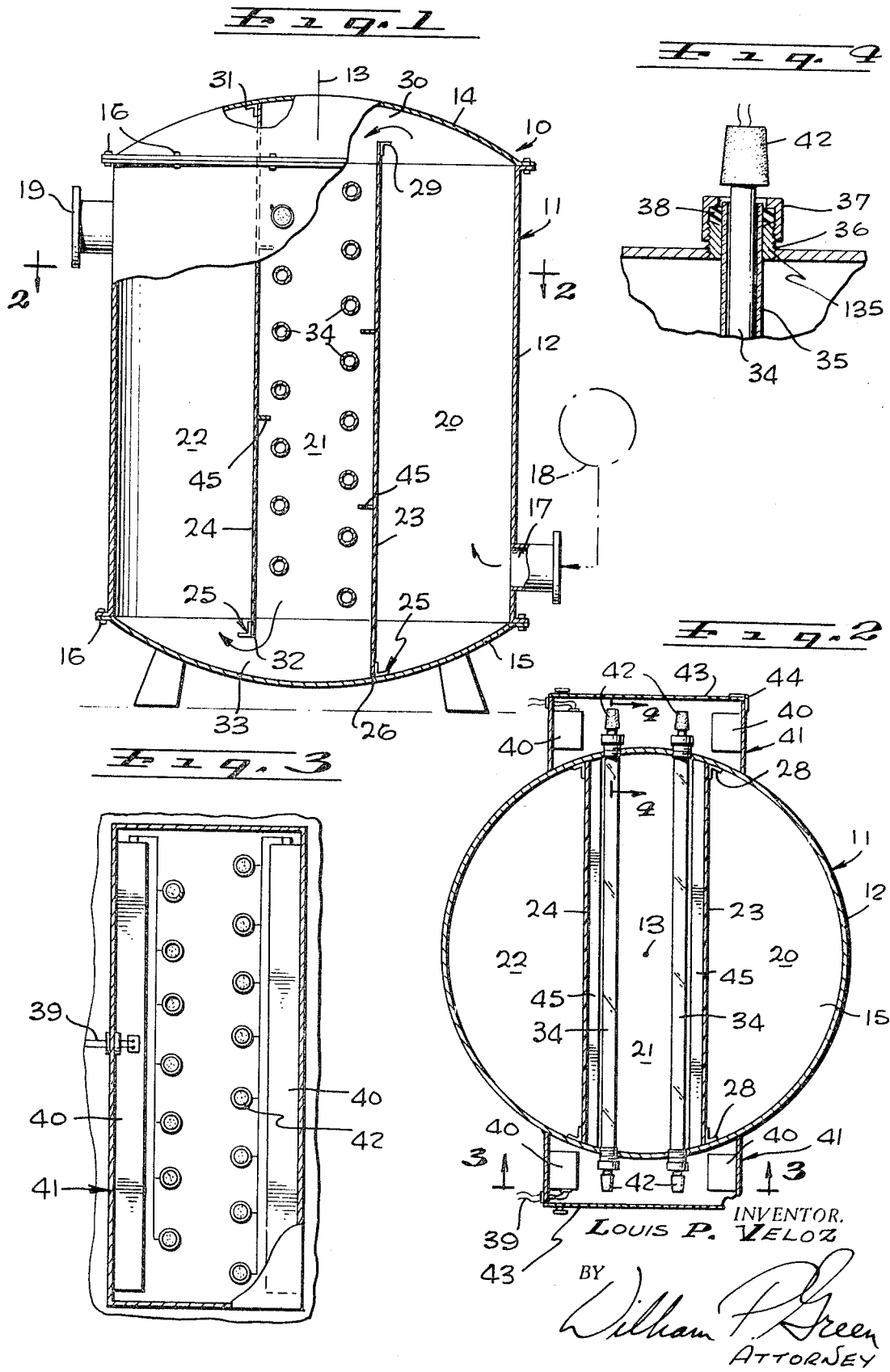

STERILIZATION OF FLUIDS BY ULTRAVIOLET RADIATION

BACKGROUND OF THE INVENTION

This invention relates to improved apparatus for sterilizing water or another fluid by directing ultraviolet radiation through the fluid as it passes through a shell.

In conventional ultraviolet-type fluid-sterilizing systems, one or more ultraviolet lamps are provided within a pressure vessel or shell, and the fluid to be sterilized is passed through a space about the lamp or lamps in a relation subjecting the fluid to the emitted radiation. One disadvantage of such equipment as heretofore designed is that, in order to assure complete sterilization of the fluid, it has been necessary to utilize lamps which produce so intense a radiation field within the primary fluid flow passage that much of this radiation does not in fact serve the intended purpose of striking and destroying unwanted organisms in the fluid, but rather merely strikes the surrounding walls of the shell about the fluid passage, and is absorbed by those walls without sterilizing effect. Thus, a large percentage of the radiation is in fact lost by such absorption by the shell walls, in a manner reducing the overall sterilizing efficiency of the equipment, and requiring higher-intensity lamps and lower fluid flow rates than would be desired.

SUMMARY OF THE INVENTION

The present invention provides improved ultraviolet-type fluid-sterilizing apparatus which is especially designed to avoid or minimize the above-discussed inefficiencies resulting from absorption of excessive amounts of radiation by the walls of the pressure vessel. Instead of wasting this radiation by such absorption after travel across the primary sterilizing chamber, the radiation remaining after such travel is put to use effectively in one or more supplementary sterilizing chambers, in a manner utilizing its remaining radiational energy to increase the overall sterilizing effect of the apparatus. Preferably, the fluid being sterilized is directed sequentially through the primary and supplementary sterilization chambers, so that the same fluid is subjected to both the primary and secondary radiation effects, in a manner enabling maximization of the rate of fluid flow through the apparatus for a particular size of pressure vessel, and a particular overall lamp intensity.

To achieve these results, I provide within the pressure vessel a partition which separates the vessel into two compartments through which the fluid being treated is directed. The partition is formed of a material adapted to pass ultraviolet radiation therethrough, so that an ultraviolet source in or near one of the compartments may emit radiation through liquid within that compartment, and then through the partition and into liquid within the second compartment, to thereby utilize the energy of the radiation in its entirety for the desired sterilizing purpose, while at the same time maintaining a very high intensity of radiation across the entire path of travel through the first compartment to completely assure effective overall sterilization. For best results, two such partitions are provided, at opposite sides of a primary radiation compartment within which the ultraviolet sources are located, so that two supplementary radiation compartments at opposite sides of the primary compartment utilize with maximum effectiveness the radiation emitted in opposite directions from the sources. The fluid may then be passed first through one of the supplementary compartments, then through the central high-intensity primary compartment, and finally through the second supplementary radiation compartment before discharge from the vessel.

BRIEF DESCRIPTION OF THE DRAWING

The above and other features and objects of the invention will be better understood from the following detailed description of the typical embodiment illustrated in the accompanying drawing, in which:

FIG. 1 is primarily a vertical section through a sterilizing unit constructed in accordance with the invention, but with a portion of the device being shown in elevation;

FIG. 2 is a horizontal section taken on line 2—2 of FIG. 1;

FIG. 3 is a vertical section taken on line 3—3 of FIG. 2; and

FIG. 4 is an enlarged fragmentary section taken on line 4—4 of FIG. 2.

DESCRIPTION OF THE PREFERRED EMBODIMENT

Referring to FIG. 1, there is illustrated at 10 a sterilizing unit embodying the invention, which may be utilized for sterilizing water, an aqueous solution, or any other fluid which contains organisms to be destroyed and which will pass ultraviolet radiation sufficiently to be sterilizable effectively by such radiation. The unit 10 includes an outer shell or pressure vessel 11, preferably having a cylindrical sidewall 12 which is typically disposed about a vertical axis 13. The opposite ends of the vessel are closed by two essentially horizontal convex top and bottom walls 14 and 15, which may be appropriately sealed with respect to the opposite ends of cylindrical sidewall 12, and are secured tightly to the sidewall by bolts 16. The fluid to be sterilized enters one side of the cylindrical shell or pressure vessel, near the bottom of the shell, through an inlet 17, which receives the fluid under pressure from an appropriate source 18. The fluid, after sterilization, flows from the shell through an outlet 19, connected into the opposite side of sidewall 12 near the top of the vessel.

The interior of the shell is divided into three vertical compartments 20, 21 and 22 by two essentially planar parallel partitions 23 and 24. These partitions are formed of a material which is substantially transparent to ultraviolet radiation of the type emitted by the lamps utilized in the apparatus, so that the radiation may pass readily through the partitions from central compartment 21 to the supplementary side compartments 20 and 22. The material forming partitions 23 and 24 is also so chosen as to minimize the tendency for adherence of any substances in the fluid being treated to the partitions, so that the capacity to pass the radiation through the partitions will not be diminished by accumulation of impurities on the surfaces of the partitions. To attain both of these purposes, the partitions may be formed of a fluorocarbon polymer, preferably polytetrafluoroethylene, as sold by E. I. du Pont de Nemours under the trade name "Teflon" (FEP type). Optimally, a very thin film of this resinous plastic material is utilized for each of the partitions, with the film being stretched over and peripherally secured to a rigid rectangular frame 25 appropriately held in position in the shell.

To describe in detail the positioning of the first partition 23 within the shell, this partition extends vertically and parallel to axis 13, at a location spaced rightwardly from the axis as seen in FIG. 1. The lower edge 26 of partition 23 extends along and is sealed with respect to the upper surface of bottom wall 15 of the shell, with a generally horizontal but curving portion of the associated frame 25 to which the bottom edge of the partition is connected being welded or otherwise secured to, and following the curvature of, end wall 15. At its opposite sides, the partition 23 is connected continuously to two vertical portions 28 of the associated frame 25 (see FIG. 2), which extend along and are welded or otherwise secured to, and sealed with respect to, sidewall 12 of the shell. The upper edge of partition 23 is connected to the horizontally extending portion 29 of the frame, which is spaced beneath top wall 14 of the shell in a manner providing a passage 30 through which fluid may flow from the upper portion of compartment 20 into the upper portion of compartment 21, without permitting flow between these two compartments at any other location.

The second partition 24 is constructed the same as, and is parallel to, partition 23, but has its frame 25 secured to top wall 14 of the shell at 31, while having its horizontal bottom edge 32 spaced above bottom wall 15 in a manner providing a fluid flow gap or passage 33 between which fluid may flow from the lower end of compartment 21 into the lower end of compartment 22. Except at this location, the partition 24 is sealed peripherally to the side and top walls of the shell, so that only at the location 33 are the two compartments 21 and 22 in communication.

The partitions 23 and 24 are spaced equally from axis 13, and are desirably so located that the horizontal cross sections of compartments 20, 21 and 22, as seen in FIG. 2, are substantially equal to one another, and the volumes of these compartments are therefore equal to one another, all in a manner facilitating flow of a stream of fluid through the three compartments sequentially and at a maximum rate of flow.

Within the central compartment 21, there are provided a series of elongated ultraviolet lamps 34 (typically 15 such lamps in the illustrated arrangement), extending horizontally and parallel to one another and parallel to but spaced from the two partitions 23 and 24. Each of these lamps may be a conventional quartz tube-type lamp, and may be received removably within an associated cylindrical sleeve or tube 35 formed of an ultraviolet-passing material, such as quartz. The opposite ends of each of the quartz sleeves 35 project from the shell through two aligned associated externally threaded nipples 135 (FIG. 4), which may be secured appropriately to the sidewall of the shell as by welding at 36. A threaded compression nut 37 is threaded onto each of the nipples 135, and when tightened acts to compress an annular seal ring 38 of rubber or the like, in a manner pressing it axially into annular sealing engagement with the concave end surface of nipple 135, and pressing it radially inwardly into annular sealing engagement with the outer surface of quartz tube 35, to thereby form effective fluidtight seal between the housing and the tubes 35 at the opposite ends of each tube. In this way, seals are formed at the locations of the lamps, preventing escape of any of the fluid from the shell at those locations, while still isolating the lamps from the fluid and permitting the lamps to be removed from their respective tubes 35 for replacement.

Electrical power is supplied to the lamps from appropriate powerlines represented at 39 in FIG. 2, with appropriate ballasts for the lamps being provided at 40 within two housings 41 at opposite sides of shell 11, and with the actual power connections to the lamps being effected through the usual sockets 42. To enable access to the ballasts and to the ends of the lamps for repair or replacement, each of the side housings 41 may have a door 43 hinged at 44 for opening movement.

In using the apparatus, assume that water or another fluid under pressure is being supplied by source 18 of FIG. 1, and is being forced into inlet 17 of the shell. This water will then flow upwardly within compartment 20, then laterally through space 31 at the top of the shell into the upper end of compartment 21, then downwardly within that compartment and laterally at 33 for upflow through compartment 22 to the outlet 19. While the liquid is flowing downwardly through the central compartment 21, it is subjected to ultraviolet radiation at high intensity, which passes through the liquid within compartment 21 to strike and destroy any micro-organisms contained within the fluid. Some of the radiation is absorbed by these organisms and by the fluid, but much of it, say, for example, about one-half of the radiation, reaches partitions 23 and 24 without being absorbed in the fluid or its contaminants. If partitions 23 and 24 were formed of metal or other material incapable of passing ultraviolet, the radiation reaching those partitions would be absorbed by them, and would therefore be ineffective in destroying any organisms within the fluid. In the arrangement of the present application, on the other hand, this radiation which reaches partitions 23 and 24 continues through those partitions with very little absorption therein, and then continues laterally beyond the partitions and into and through the fluid within compartments 20 and 22. The radiation intensity within these two side compartments 20 and 22 is less than the intensity within central primary compartment 21, but is definitely at a sufficiently high level to produce a very substantial sterilizing effect on the fluid. This low-intensity radiation strikes organisms within compartment 20 as the fluid passes upwardly within that compartment, and even if the intensity is not sufficient to kill the organisms in that compartment, they are measurably weakened by this pretreatment. Similarly, the supplemental irradiation of the organisms within the final compartment 22 adds substantially to the overall sterilizing effect, with the result that the radiation intensity within central compartment 21 may be reduced, or the overall rate of fluid flow through the apparatus may be increased, as compared with the conditions which would be required if the supplementary or secondary sterilization effects within compartments 20 and 22 were not attained. For best results, the dimensions of the shell 11, and the number and strength of ultraviolet lamps 34, are so selected that, by the time the radiation has passed from the lamps laterally through one of the partitions 23 or 24 and through the corresponding side compartment 20 or 22, and has reached the cylindrical sidewall 12 at the outer side of that compartment, substantially all of the radiation will have been absorbed by the fluid and its contaminants, so that there will then be substantially no loss of radiation through absorption by the outer sidewall 12 of the shell. The teflon forming partitions 23 and 24 is inherently of such a nature that contaminants carried by the fluid will not adhere to the partitions, and consequently those partitions remain substantially permanently clean and transparent to the ultraviolet radiation from the lamps.

In order to maximize the chances for the radiation within primary compartment 21 to strike and destroy all of the micro-organisms carried by the fluid, I may provide within compartment 21 a number of narrow parallel horizontal baffles 45 (FIG. 1), positioned adjacent or secured to the partitions 23 and 24, and extending between opposite sides of the cylindrical sidewall of the shell, with the baffles adjacent the two partitions being staggered as shown in FIG. 1 in a manner requiring the downflowing fluid within compartment 21 to follow a somewhat circuitous path as it moves downwardly. That is, the fluid first moves rightwardly to pass an initial one of the baffles, then leftwardly a short distance to pass the next baffle, then rightwardly, etc., in a manner introducing sufficient slight turbulence into the fluid to appropriately expose all of the micro-organisms to the radiation as the fluid moves downwardly.

While a certain specific embodiment of the present invention has been disclosed as typical, the invention is of course not limited to this particular form, but rather is applicable broadly to all such variations as fall within the scope of the appended claims.

I claim:

1. Fluid-sterilizing apparatus comprising a hollow shell, two partitions in the shell formed of material at least partially transparent to ultraviolet radiation and forming an inner compartment between the partitions and two additional compartments at opposite sides thereof, inlet and outlet means for passing fluid through said three compartments, and ultraviolet radiation source means positioned within said inner compartment and emitting ultraviolet radiation in opposite directions through fluid in the inner compartment and then through both of said partitions into fluid within both of said additional compartments, said partitions and said inlet and outlet means and the remainder of said apparatus being constructed to require flow of all of said fluid through said three compartments sequentially so that all of the fluid is first passed through a relatively low-intensity radiation zone in one of said additional compartments at a first side of said inner compartment, then through a high-intensity radiation zone in said inner compartment between said partitions, and then through a low-intensity radiation zone in the other of said additional compartments at the opposite side of said inner compartment.

2. Fluid-sterilizing apparatus as recited in claim 1, in which said compartments are so dimensioned that the radiation which passes through said partitions is absorbed approximately completely by the fluid and its contaminants by the time the radiation has travelled across said additional compartments.

3. Fluid-sterilizing apparatus as recited in claim 1, in which both of said partitions are formed of polytetrafluoroethylene.

4. Fluid-sterilizing apparatus as recited in claim 1, in which said shell has an essentially cylindrical sidewall, said radiation source means including elongated ultraviolet lamps extending essentially transversely of the axis of said cylindrical sidewall.

5. Fluid-sterilizing apparatus as recited in claim 1, in which said shell has an essentially cylindrical sidewall, said partitions extending generally parallel to the axis of said cylindrical sidewall at opposite sides thereof, said radiation source means including elongated ultraviolet lamps extending essentially transversely of said axis and essentially parallel to and between said partitions.

6. Fluid-sterilizing apparatus as recited in claim 1, in which said radiation source means include elongated ultraviolet lamps extending essentially parallel to said partitions.

7. Fluid-sterilizing apparatus as recited in claim 1, in which said shell has an essentially cylindrical sidewall and two opposite end walls, said partitions extending generally parallel to the axis of said cylindrical sidewall and to one another at opposite sides of the axis and at opposite sides of said radiation source means, said radiation source means including elongated ultraviolet lamps extending essentially transversely of said axis of said cylindrical sidewall and essentially parallel to and between said partitions, one of said partitions commencing at essentially one of said end walls and being spaced from the other end wall to pass fluid at that location between two compartments, the other of said partitions commencing at essentially said other end wall and being spaced from said one end wall to pass fluid at that location between two compartments, said inlet and outlet means being positioned to introduce said fluid into a first end of one of said additional compartments and discharge it from the opposite end of the other additional compartment in a relation requiring all of said fluid to first flow from said inlet means in a first axial direction within one of the additional compartments, then flow in essentially the opposite axial direction within said inner compartment, and then in essentially said first axial direction within the other of said additional compartments to the outlet means.

* * * * *